United States Patent
Liu et al.

(10) Patent No.: US 11,006,046 B2
(45) Date of Patent: May 11, 2021

(54) IMAGE PROCESSING METHOD AND MOBILE TERMINAL

(71) Applicant: GUANGDONG OPPO MOBILE TELECOMMUNICATIONS CORP., LTD., Guangdong (CN)

(72) Inventors: Yaoyong Liu, Guangdong (CN); Yan Chen, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/537,609

(22) Filed: Aug. 11, 2019

(65) Prior Publication Data

US 2020/0059605 A1 Feb. 20, 2020

(30) Foreign Application Priority Data

Aug. 17, 2018 (CN) .......................... 201810942727.X

(51) Int. Cl.
*H04N 5/228* (2006.01)
*H04N 5/232* (2006.01)
(Continued)

(52) U.S. Cl.
CPC ..... *H04N 5/232935* (2018.08); *G06T 7/0002* (2013.01); *G06T 7/70* (2017.01);
(Continued)

(58) Field of Classification Search
CPC ....... H04N 5/232935; H04N 5/232939; H04N 5/23216; G06T 7/80; G06T 7/97; G06T 7/70
(Continued)

(56) References Cited

U.S. PATENT DOCUMENTS 8,363,951 B2 * 1/2013 Bigioi ............... G06K 9/00221
382/190
2007/0013957 A1 1/2007 Kim et al.
(Continued)

FOREIGN PATENT DOCUMENTS

CN 104144289 11/2014
CN 104469151 3/2015
(Continued)

OTHER PUBLICATIONS

EPO, Office Action for EP Application No. 19192226.9, dated Aug. 21, 2020.
(Continued)

*Primary Examiner* — Usman A Khan
(74) *Attorney, Agent, or Firm* — Hodgson Russ LLP

(57) ABSTRACT

The embodiment of the disclosure discloses a method and an apparatus for image processing, and a mobile terminal. The method may include: acquiring image parameters of a real-time preview image displayed in a preview interface; evaluating, based on the image parameters and a pre-established image evaluation model, the real-time preview image to obtain an evaluation result; and displaying the evaluation result. The method enables the user of the mobile terminal to obtain the evaluation result of the real-time preview image displayed in the preview interface in real time, so that the user can get the quality of the current real-time preview image in real time, and the user can adjust the real-time preview image as needed, in order to obtain images with better evaluation results, thereby improving the overall quality of the images captured by the mobile terminal.

20 Claims, 10 Drawing Sheets acquiring image parameters of a real-time preview image displayed in a preview interface — B110 evaluating, based on the image parameters and a pre-established image evaluation model, the real-time preview image to obtain an evaluation result — B120 displaying the evaluation result — B130

(51) Int. Cl.
*G06T 7/80* (2017.01)
*G06T 7/00* (2017.01)
*G06T 7/70* (2017.01)

(52) U.S. Cl.
CPC .................. *G06T 7/80* (2017.01); *G06T 7/97* (2017.01); *H04N 5/23216* (2013.01); *H04N 5/23219* (2013.01); *H04N 5/23222* (2013.01); *H04N 5/23245* (2013.01); *H04N 5/232939* (2018.08); *G06T 2207/30168* (2013.01); *G06T 2207/30201* (2013.01); *G06T 2207/30244* (2013.01)

(58) Field of Classification Search
USPC ...................................................... 348/222.1
See application file for complete search history.

(56) References Cited

U.S. PATENT DOCUMENTS

| | | | | |
|---|---|---|---|---|
| 2008/0285816 | A1* | 11/2008 | Kim | H04N 5/23219 382/118 |
| 2017/0142332 | A1 | 5/2017 | He et al. | |

FOREIGN PATENT DOCUMENTS

| | | | |
|---|---|---|---|
| CN | 105120167 | 12/2015 | |
| CN | 105635567 | 6/2016 | |
| CN | 105635584 | 6/2016 | |
| CN | 107679475 | 2/2018 | |
| CN | 107945175 | 4/2018 | |
| CN | 108174185 | 6/2018 | |
| CN | 108234870 | 6/2018 | |
| WO | 2018120662 | 7/2018 | |
| WO | WO-2018120662 A1 * | 7/2018 | ............... G06K 9/00 |

OTHER PUBLICATIONS

SIPO, Office Action for CN Application No. 201810942727.X, dated Jun. 28, 2020.
EPO, Office Action for EP Application No. 19192226.9, dated Jan. 13, 2020.
WIPO, English Translation of ISR/WO for PCT/CN2019/099878, Oct. 28, 2019.
SIPO, Second Office Action for CN Application No. 201810942727.X, dated Feb. 5, 2021.
IPI, Office Action for IN Application No. 201914033145, dated Mar. 12, 2021.

* cited by examiner

IMAGE PROCESSING METHOD AND MOBILE TERMINAL

CROSS-REFERENCE TO RELATED APPLICATION

This application claims priority to Chinese Patent Application No. 201810942727.X, filed Aug. 17, 2018, the entire disclosure of which is incorporated herein by reference.

TECHNICAL FIELD

The present disclosure relates to the field of mobile terminal technologies, and more particular, to a method and an apparatus for image processing, and a mobile terminal.

BACKGROUND

When a mobile terminal is equipped with an image capturing device, the user may use the mobile terminal to capture images, for example, taking pictures or recording videos. However, the quality of the images captured by the mobile terminal is not stable enough.

BRIEF DESCRIPTION OF THE DRAWINGS

In order to more clearly illustrate the technical solutions in the embodiments of the present application, the drawings used in the description of the embodiments are briefly described below. It is obvious that the drawings below are just some embodiments of the present application, and other drawings can also be obtained from those skilled in the art based on these drawings without paying any creative effort.

DETAILED DESCRIPTION OF PREFERRED EMBODIMENTS

Figure 1:
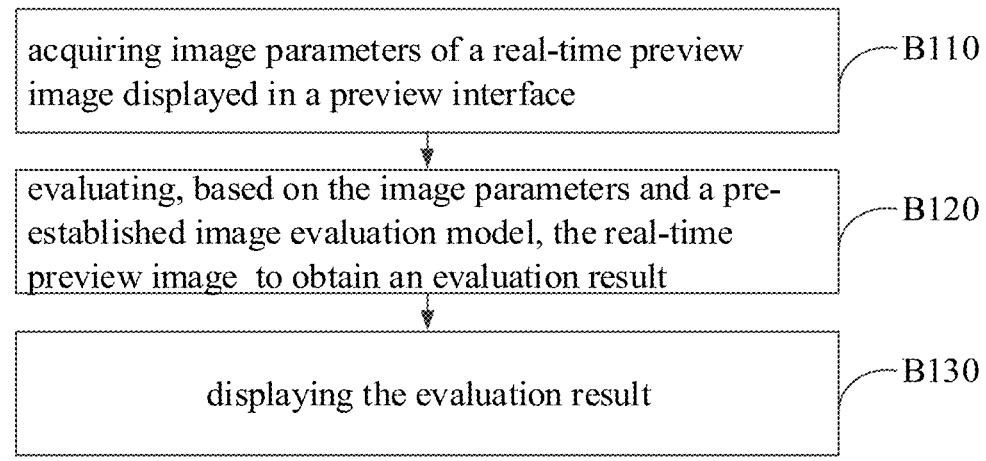
FIG. 1 is a flow chart of an image processing method provided by the disclosure.

The technical solutions in the embodiments of the disclosure will be clearly and completely described in the following with reference to the accompanying drawings in the embodiments. All other embodiments obtained by a person of ordinary skill in the art, based on the embodiments of the disclosure without creative efforts, are within the scope of the present disclosure.

As more mobile terminals are equipped with cameras, mobile terminal users are more accustomed to using mobile terminals for image capturing. For example, using mobile terminals to take pictures, or using mobile terminals to record videos or the like.

In the study, the inventors found that the quality of images captured by mobile terminals through their cameras may be affected by many factors.

For example, the quality of images captured by mobile terminals may be affected by exposure, sharpness, color information, and noise information in the image. It should be noted that, in the following content of the disclosure, the exposure, the sharpness, the color information, and the noise information are collectively referred to as quality information.

Wherein exposure refers to a process, in which light emitted or reflected by a photographed object is projected onto a photosensitive member through a lens of a camera to cause it undergoes a chemical change to develop. The level of exposure is the extent to which the photosensitive member is irradiated by the light. If the exposure level is too large, it will cause the captured image abnormal, and will make the color of the image to be white, thus affecting the quality of the captured image.

Sharpness can refer to the clarity of details and boundaries in the image. The sharpness can finely correspond to the subjective feelings of the human being, and a low sharpness of the image shows blurring of the image.

Color information can refer to the degree of color shift of the image. The color shift means that the hue and saturation of a certain color in the captured image are significantly different from that of a real image. If the color shift is too large, it also will affect the quality of the captured image.

Noise information can be the number or distribution of noise in the image, and the noise is a phenomenon of random variation of brightness or color information in the image (the photographed object itself has no noise). The noise is generally generated by a sensor and a circuit of the camera, and it may also be caused by an inevitable shot noise in an ideal photodetector. If there is a lot of noise in the image, it will also affect the quality of the image.

In addition, the inventors have found that besides the above exposure, sharpness, color information, and noise information in the image affect the quality of the captured image of the mobile terminal, composition information of the image also affects the quality of the image in terms of aesthetics. The composition information includes composition molds and position information of a composition target in the image. It can be understood that, if the composition mold is different, then the corresponding composition target may be different.

For example, the composition modes may include a portrait mode, an object mode, a landscape mode, and the like. It can be understood that, the composition target corresponding to the portrait mode is a human being, the composition target corresponding to the object mode is an object, and the composition target corresponding to the landscape mode is a horizontal line or a dividing line.

The inventor found in the research that the quality of the image captured by the mobile terminal will be affected by various factors mentioned above. Therefore, the quality of the captured image will fluctuate greatly, and the quality of the captured image is not stable enough overall, resulting in the existence of many lower quality images in the captured images. Therefore, the inventors provide an image processing method, an image processing apparatus, and a mobile terminal that can improve the quality of images captured by the mobile terminal overall and improve the user experience in an image capturing process.

In some embodiments of the disclosure, a method for image processing is provided, The method is applied to a mobile terminal. The method comprises: acquiring image parameters of a real-time preview image displayed in a preview interface; evaluating, based on the image parameters and a pre-established image evaluation model, the real-time preview image to obtain an evaluation result; and displaying the evaluation result.

In some embodiments, the image parameters comprise quality information and composition information; wherein the operation of evaluating the real-time preview image to obtain an evaluation result comprises: evaluating, based on the quality information, the composition information, and the pre-established image evaluation model, the real-time preview image to obtain the evaluation result.

In some embodiments, the quality information comprises at least one of exposure, sharpness, color information, and noise information; and the composition information includes a composition mode and position information of a composition target corresponding to the composition mode in the image.

In some embodiments, the method further comprises: displaying a message for reminding a user to adjust image capturing parameters of a mobile terminal according to the evaluation result.

In some embodiments, the image capturing parameters comprise an exposure or focus parameters, the evaluation result comprises an evaluation score; wherein the operation of displaying a message for reminding a user to adjust image capturing parameters of the mobile terminal according to the evaluation result comprises: displaying a message for reminding the user to adjust the exposure or the focus parameters, when the evaluation score is lower than a first threshold.

In some embodiments, the image capturing parameters further comprise a position of the mobile terminal; wherein the operation of displaying a message for reminding a user to adjust image capturing parameters of the mobile terminal according to the evaluation result comprises: displaying a message for reminding the user to adjust the position of the mobile terminal, when the evaluation score is greater than the first threshold and less than a second threshold.

In some embodiments, before the operation of evaluating the real-time preview image to obtain an evaluation result, the method further comprises: judging whether the quality information and the composition information of the real-time preview image displayed in the preview interface are changed, compared with the quality information and the composition information of a previous real-time preview image; when the quality information changes, performing the operation of evaluating the real-time preview image to obtain an evaluation result; when the composition information changes, setting a timing length, if the composition information remains unchanged during the timing length, performing the operation of evaluating the real-time preview image to obtain an evaluation result.

In some embodiments, the operation of displaying the evaluation result comprises: floating display a strip control and an identifier control slidable on the strip control, wherein the strip control displays a plurality of interval segments sequentially from one end to the other end; and controlling the identifier control to be displayed in one of the plurality of interval segment which is corresponding to the evaluation result.

In some embodiments, the method further comprises: displaying a message for reminding a user to adjust image capturing parameters of the mobile terminal according to the evaluation result; wherein the message is displayed adjacent to and parallel with the strip control.

In some embodiments, the composition mode is selected from one of portrait mode, object mode, and landscape mode, the composition target corresponding to the portrait mode is a human being, the composition target corresponding to the object mode is an object, and the composition target corresponding to the landscape mode is a horizontal line or a dividing line.

In some embodiments, the composition mode is determined as the portrait mode when the real-time preview image is recognized to include a human face, and position information of the human body in the image is determined according to the position of the recognized human face relative to a boundary of the image.

In some embodiments, the composition mode is determined as the object mode when the real-time preview image has a foreground image without a human face, and position information of the object is determined according to the distance from a center of the object to a center of the real-time preview image.

In the disclosure, an apparatus for image processing is provided. The apparatus comprises: an image parameters acquisition unit, configured to acquire image parameters of a real-time preview image displayed in a preview interface; an image evaluation unit, configured to evaluate, based on the image parameters and a pre-established image evaluation model, the real-time preview image to obtain an evaluation result; and an evaluation result display unit, configured to display the evaluation result.

In some embodiments, the apparatus further comprises an adjustment reminding unit, wherein the adjustment reminding unit is configured to display a message for reminding a user to adjust image capturing parameters of a mobile terminal according to the evaluation result.

In some embodiments, the apparatus further comprises a parameters comparison unit, wherein the image parameters comprise quality information and composition information, wherein the parameters comparison unit is configured to judge whether the quality information and the composition information of the real-time preview image displayed in the preview interface changes or not, compared to that of a previous real-time preview image displayed in the preview interface.

In some embodiments, the apparatus further comprises a timing unit, wherein the timing unit is configured to start timing when the parameters comparison unit determines that the composition information changes.

The disclosure further provides a mobile terminal, which comprises one or more processor(s) and a memory. One or more program(s) is(are) stored in the memory and configured to be executed by the one or more processor(s), the one or more program(s) is(are) configured to perform a method for image processing when being executed, and the method comprises: acquiring image parameters of a real-time preview image displayed in a preview interface; evaluating, based on the image parameters and a pre-established image evaluation model, the real-time preview image to obtain an evaluation result; and displaying the evaluation result.

In some embodiments, the mobile terminal further comprises a screen, wherein the preview interface is displayed on the screen, and the evaluation result is displayed in the preview interface.

In some embodiments, a control interface is displayed on the screen adjacent to the preview interface, and a control button, an image browsing button, and a front and rear camera switching button are displayed in the control interface.

In some embodiments, the mobile terminal further comprises a position sensor coupled to the one or more processor(s), the position sensor is configured to capture a position of the mobile terminal.

Embodiments of the present disclosure will be specifically described below with reference to the accompanying drawings.

Referring to FIG. 1, the disclosure provides a method for image processing, applied to a mobile terminal. The method includes:

Block B110: image parameters of a real-time preview image displayed in a preview interface are acquired.

Figure 2:
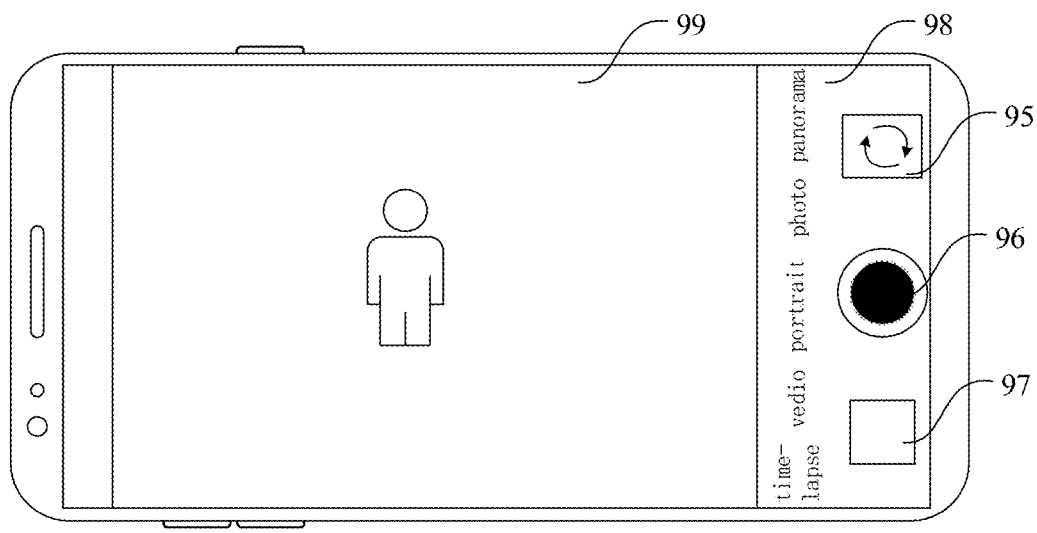
FIG. 2 is a schematic diagram of a preview interface in an image processing method provided by the disclosure.

As a manner, the mobile terminal is installed with an application program that controls the camera to start, shut down, or capture images. The preview interface can be the interface displayed when the application program runs in the foreground after it starts. In this case, after the application program is started and run in the foreground, the camera of the mobile terminal can be triggered to start capturing an image, thereby to display the captured image as the real-time preview image in the preview interface. As another manner and as shown in FIG. 2, after the application program is started, a preview interface 99 and a control interface 98 may be displayed, a real-time preview image may be displayed in the preview interface 99, and a control button 96 for controlling a camera to take pictures, an image browsing button 97, a front and rear camera switching button 95 and the like can be displayed in the control interface 98.

It can be understood that the real-time preview image displayed in the preview interface reflects the image captured by the camera in real time, and the real-time preview image is not stored in an album of the mobile terminal before being triggered by the user.

Block B120: based on the image parameters and a pre-established image evaluation model, the real-time preview image is evaluated to obtain an evaluation result.

Wherein the image evaluation model can be obtained by training in advance, as a way. In some embodiments, the image evaluation model is obtained by training CNN convolutional neural network.

The CNN convolutional neural network is a feedforward neural network, whose artificial neurons can respond to a part of surrounding neurons in the coverage and have excellent performance for large image processing. The convolutional neural network is very similar to ordinary neural networks, and they all consist of neurons with learnable weights and biases. Each neuron receives some input and does some dot product calculations, and outputs scores of each category. The convolutional neural network uses the characteristics of images as the input to design the neurons into three dimensions: width, height, depth (note that the depth here is not the depth of the neural network, but is used to describe the neurons). For example, if the input image has a size of 32×32×3 (rgb), then the input neurons also have dimensions of 32×32×3.

In the disclosure, during the process of training to obtain the image evaluation model, a lightweight CNN convolutional neural network, that is, a mobilenet network, can be adopted. During the training process, a large number of images are captured firstly, and the captured images are respectively disposed in different folders according to scores. Then, the data in different folders is converted into data in the format of .tfrecord, a tensorflow training framework is adopted to train the mobilenet network. After many times of training (for example, 1 million times), the image evaluation model can be obtained.

After obtaining the image evaluation model, the image evaluation model may be quantized and compressed to be stored in the mobile terminal for invoking. Wherein a quantization can refer to converting floating point weight data into shaped data, thereby reducing the amount of computation and saving memory space. Compression may mean to reduce the data close to 0 in the network weight, thereby further reducing the size of the model.

As one manner, the image parameters include the quality information and the composition information. The operation of evaluating the real-time preview image to obtain an evaluation result include: based on the quality information, the composition information, and the image evaluation model, the real-time preview image is evaluated, and an evaluation result is obtained.

In some embodiments, the quality information includes at least one of the exposure, the sharpness, the color information, and the noise information. The composition information includes a composition mode and position information of a composition target corresponding to the composition mode in the image.

It is understood that, during the evaluation process, the mobile terminal inputs at least one of the acquired exposure, sharpness, color information, and noise information into the image evaluation model, and then the mobile terminal runs the image evaluation model to obtain the evaluation result in the form of scores.

As a manner, the mobile terminal may first cache the real-time preview images to a specified storage location, which may be divided from a storage space that the mobile terminal has allocated to the foregoing application program, so as not to occupy other storage space of the mobile terminal. After the real-time preview images are cached to the specified location, at least one of the exposure, the sharpness, the color information, and the noise information of the cached real-time preview image is acquired. Wherein, as one way, an exposure time can be obtained by the Exif information of the image, and the time length of the exposure time is taken as the exposure level described above.

In the disclosure, the sharpness of the real-time preview image can be obtained by various ways. As one of them, the sharpness of the real-time preview image can be determined by blurring the real-time preview image.

It is understood that, if an image is blurred, when a blur processing is performed on it, high frequency components in the image will not be changed too much. However, if the image itself has a high sharpness and is performed with a blur processing, the high-frequency components will be changed greatly. So, as a way, the mobile terminal can obtain a degraded image of the stored real-time preview image by performing a blur processing (for example, a Gaussian blur processing) on the stored real-time preview image, and then compare changes of the adjacent pixel values in the image before the blur processing and the image after the blur processing. The changes of the adjacent pixel values determine the level of the sharpness value. Then in this case, the greater the changes, the higher the sharpness of the originally stored real-time preview image.

Further, in addition to the above-described method of determining the real-time preview image by blurring the real-time preview image, other manners also can be used to calculate the sharpness. The sharpness can be calculated by the following formula.

$$D(f) = \Sigma_y \Sigma_x |f(x+2,y) - f(x,y)|^2$$

Where f(x, y) represents the gray value of the pixel point (x, y) corresponding to the image f, and D(f) is the image sharpness calculation result. In the disclosure, f(x, y) may be selected from a high frequency component region in the real-time preview image.

For color information, it can be defined by the degree of color shift in the disclosure. As a way, the mobile terminal can determine the current color shift degree by the chromaticity distribution and the chromaticity average value of the stored real-time preview image. As a way, when the mobile terminal detects that the chromaticity distribution of the real-time preview image is substantially a single peak, or the distribution is relatively concentrated, and the chromaticity average value is greater than a preset value, it is determined that the real-time preview image has a color shift. And the value of the color shift can be determined as the color information, according to a pre-established correspondence between the chromaticity average value and the color shift.

It can be understood that if there is noise in the image, the noise may exist in an edge region (high-frequency component region) or other region of the image. Due to that the noise along the edge is not visually obvious, the mobile terminal can detect noise in other region except the edge region, as a way to shorten the evaluation time. Detection at the edge will be affected by noise, so the mobile terminal can perform a noise filtering pre-processing before detecting the edge before the edge being detected. In some embodiments, the mobile terminal may use a mean filtering to eliminate part of the noise, and the image g(x, y) after the mean filtering is:

$$g(x, y) = \frac{1}{3 \times 3} \left[ \sum_{i=-1}^{1} \sum_{j=-1}^{1} f(x+i, y+j) \right].$$

Correspondingly, a candidate noise is:

$$D_h(x, y) = |g(x, y+1) - g(x, y-1)|.$$

$$D_{h-mean} = \frac{1}{M \times N} \sum_{x=1}^{M} \sum_{y=1}^{N} D_h(x, y).$$

Similarly, the corresponding value can be calculated in the vertical direction. Then the candidate noise is:

$$N_{cand}(x, y) = \begin{cases} \max(D_v(x, y), \max(D_h(x, y))) & \text{if } D_h(x, y) < D_{h-mean} \\ & D_v(x, y) < D_{v-mean} \text{ and} \\ 0 & \text{otherwise} \end{cases}$$

Where Ncand(x, y) represents the detected noise. After statistics, the number of noises in the real-time preview image can be obtained, and the number of noises is used as noise information.

Then, after the mobile terminal calculates the exposure, the sharpness, the color information, and the noise information by the above-described manners, the calculated information can be input into the image evaluation model to calculate the evaluation result in the form of scores.

In the disclosure, one or more of the quality information, including the exposure, the sharpness, the color information, and the noise information, may be selected as an input of the image evaluation model according to the current scene. It can be understood that the image evaluation model serves as the basis for calculating the evaluation result just for the input information. For example, if just the exposure is input, the image evaluation model calculates the evaluation result just based on the exposure.

As a manner, the mobile terminal can determine which one or which information of the exposure, the sharpness, the color information, and the noise information is captured as the input of the subsequent image evaluation model according to the current image acquisition scene, so as to be able to flexibly evaluate the quality of the captured image in each scene according to the image effect most needed for each scene. As such, the user can capture higher quality images under different scenes.

For example, as a manner, in a dimly light environment, an ambient light is not too strong, so even in the case of a long exposure time, the image captured by the mobile terminal is less likely to cause poor image quality due to the exposure time being too long. And in the dim state, the color information will not affect the image quality too much. Then, as a way, the mobile terminal may be configured with a light sensor, and the image is evaluated when the mobile terminal determines that the current light is dim (for example, determining that the current light intensity value is lower than a preset value) based on the data collected by the light sensor. In the process, only the sharpness and noise information can be obtained. In the image evaluation process, the real-time preview image is evaluated based on the sharpness and noise information and the image evaluation model, and the evaluation result is obtained.

Furthermore, in a strong light environment, the exposure time has a significant influence on the quality of the acquired image. According to data collected by the light sensor, when the mobile terminal judges that it is currently in a strong light environment (for example, the current light intensity value is judged to be greater than a preset value), the real-time preview image is evaluated based on the exposure, the sharpness, the color information, the noise information, and the image evaluation model to obtain the evaluation result.

In addition to determining the type of information to be input subsequently into the image evaluation model based on the light intensity described above, it is also may be determined according to other scenes. For example, it can also be determined according to whether the current scene is to take a color photograph or to take a black and white photograph. If the current scene is to take a black and white photograph, the color information does not affect significantly on the image quality, and the mobile terminal can just obtain the exposure, the sharpness, and the noise information as the input of the image evaluation model, and the evaluation result is obtained thereby.

It can be understood that, in addition to the foregoing quality information affecting the image quality, the composition of the image will also affect the image quality in terms of aesthetics. In the disclosure, in addition to performing the image evaluation according to the aforementioned quality information, the quality of the real-time preview image also can be evaluated according to the composition information. For example, when the composition mode is a portrait mode, the composition target in the composition information is a human body, and the composition information also includes position information of the human body in the photograph.

Figure 3:
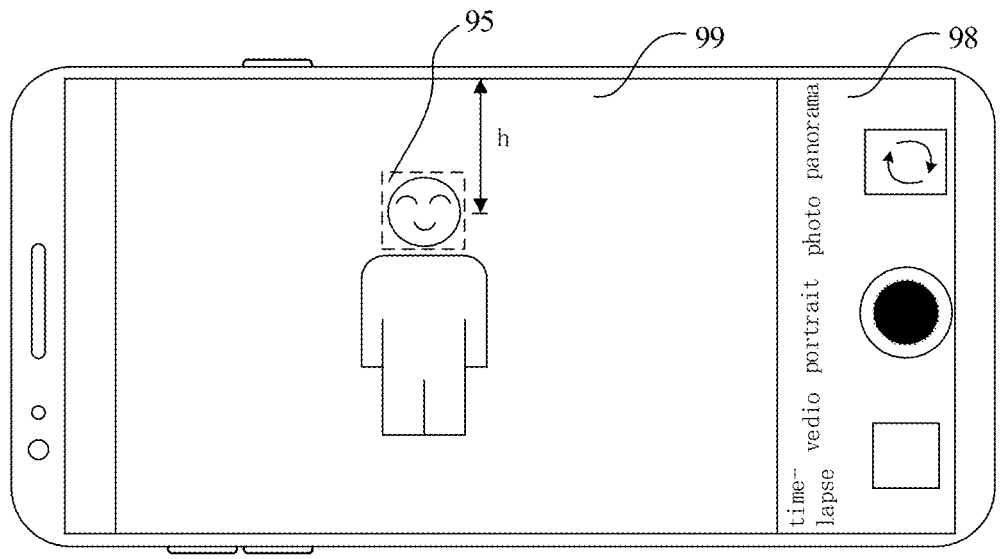
FIG. 3 is a schematic diagram of determining human body position information in an image processing method provided by the disclosure.

When the mobile terminal recognizes that the stored real-time preview image includes a human face of a human being, it judges that the current composition mode is a portrait mode, and the position information of the human body in the photograph can be determined according to the position of the recognized human face relative to a boundary of the photograph. As shown in FIG. 3, when an area 95 in the real-time preview image is recognized with a human face, the current scene is recognized to be in a portrait mode, and the position of the human body in the photograph can be determined according to the distance h from the human face to a top of the current image, thereby obtaining the position information of the human body in the image.

Figure 4:
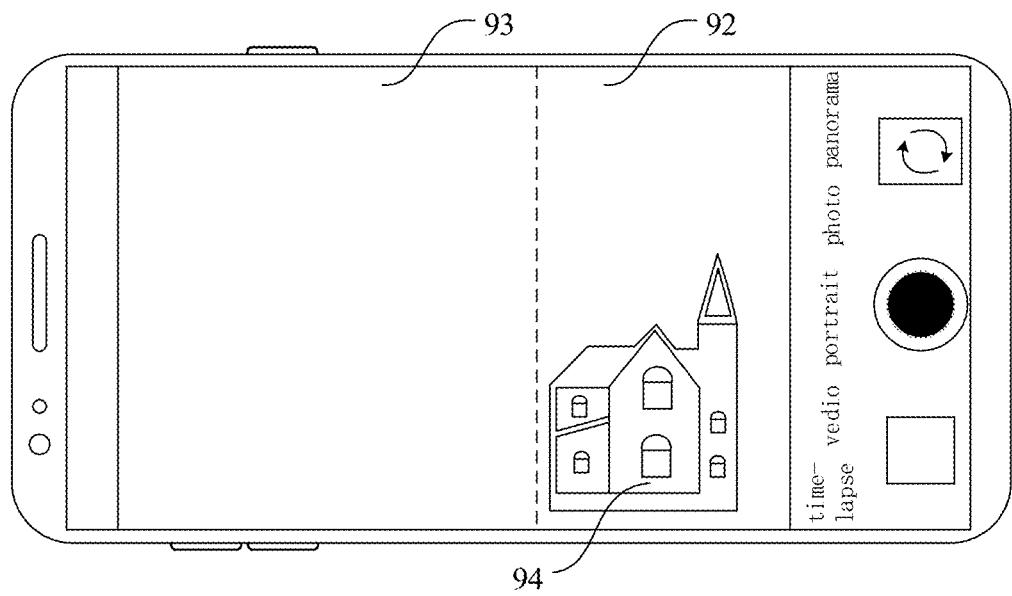
FIG. 4 is a schematic diagram of determining object position information in an image processing method provided by the disclosure.

Furthermore, in another manner, when the mobile terminal recognizes that the current real-time preview image has a foreground image, but the foreground image does not include a human face, it judges that the current mode is the object mode. It can be understood that, as shown in FIG. 4, if a recognized object 94 is in an area 92 of the preview interface and there is no object in another area 93, the captured image may be uncoordinated, resulting in poor image quality. in the case of the object mode, the distance from the center of the object to the center of the real-time preview image can be used as the position information of the object.

Figure 5:
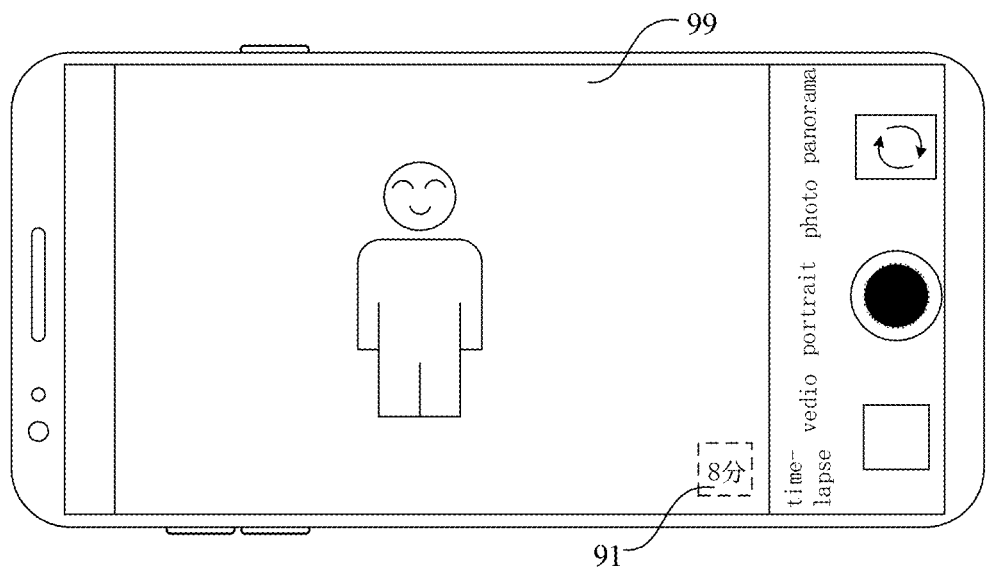
FIG. 5 is a schematic diagram showing a kind of displaying an evaluation result in an image processing method provided by the disclosure.
Figure 6:
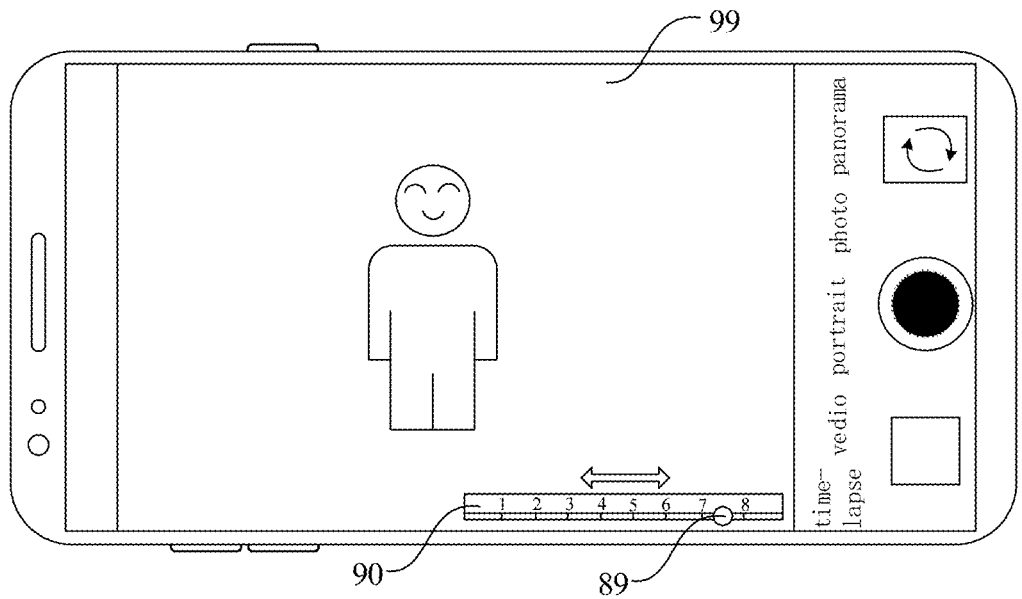
FIG. 6 is a schematic diagram showing another kind of displaying an evaluation result in an image processing method provided by the disclosure.

Block B130: the evaluation result is displayed. In some embodiments, the evaluation result is displayed in the preview interface. For example, the evaluation result is displayed at a lower right corner of the preview interface.

Wherein the evaluation result can be displayed in the form of scores in the disclosure. The evaluation result also can be displayed in various forms in the disclosure. As a manner, the evaluation score value can be displayed directly in the preview interface. As shown in FIG. 5, the mobile terminal can display an evaluation score (illustrated as 8 points) in an area 91 of the content of the preview interface 99. In addition, in another manner, the mobile terminal displays a strip control and an identifier control that can slide on the strip control in the preview interface, the strip control displays a number of interval segments from one end to the other end, and the identifier control is controlled to be displayed in the interval segment corresponding to the evaluation result. As shown in FIG. 6, a strip control 90 is displayed in the preview interface 99, and an identifier control 89 is disposed on the strip control 90. The identifier control 89 can slide on the strip control 90, that is, the sliding along a direction designated by an arrow of the image can identify the evaluation result of the current real-time preview image.

It should be noted that, as mentioned above, the mobile terminal may cache the real-time preview image to a specified storage location. In at least one embodiment, after the mobile terminal acquires the parameter information of the real-time preview image, the image may be deleted from the specified location in order to save storage space, and the parameter information of the image is reserved. The reserved parameter information can be used to compare with subsequent parameter information of the mobile terminal.

In the image processing method provided by the disclosure, after acquiring image parameters of a real-time preview image displayed in a preview interface, the real-time preview image is evaluated based on the image parameters and a pre-established image evaluation model thereby to obtain an evaluation result, and the evaluation result is displayed. Therefore, a user of the mobile terminal can obtain the evaluation result of the real-time preview image displayed in the preview interface in real time, so that the user can get the quality of the current real-time preview image in real time, and the user can adjust the real-time preview image as needed, in order to obtain images with better evaluation results, thereby improving the overall quality of the images captured by the mobile terminal.

Figure 7:
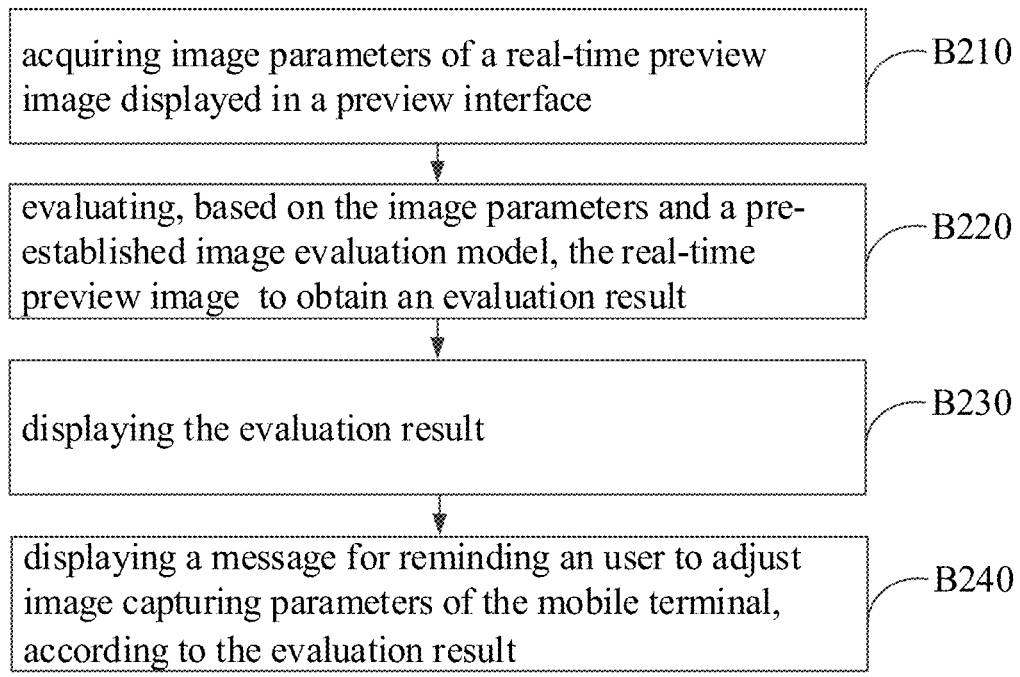
FIG. 7 is a flow chart of another image processing method provided by the disclosure.

Referring to FIG. 7, the disclosure provides an image processing method, applied to an mobile terminal. The method includes:

Block B210: image parameters of a real-time preview image displayed in a preview interface are acquired.

Block B220: the real-time preview image is evaluated based on the image parameters and a pre-established image evaluation model, and an evaluation result is obtained.

Block B230: the evaluation result is displayed.

Block B240: a message for reminding a user to adjust image capturing parameters of the mobile terminal is displayed, according to the evaluation result.

It can be understood that after obtaining the evaluation result, the mobile terminal judges the evaluation result at first. For example, when the evaluation result is in the form of scores, the mobile terminal may compare the obtained evaluation score with a set score threshold. If it is judged that the evaluation score is lower than the set score threshold, the quality of the current real-time preview image needs to be improved. The mobile terminal generates a message for reminding the user to adjust image capturing parameters of the mobile terminal, according to the obtained evaluation score.

As a manner, the image capturing parameters include an exposure level or focus parameters, wherein the focus parameters affect the sharpness of the image. Then, the operation of displaying a message for reminding the user to adjust image capturing parameters of the mobile terminal according to the evaluation result includes: if the evaluation score detected is lower than a first threshold, displaying a message for reminding the user to adjust the exposure level or the focus parameters.

Figure 8:
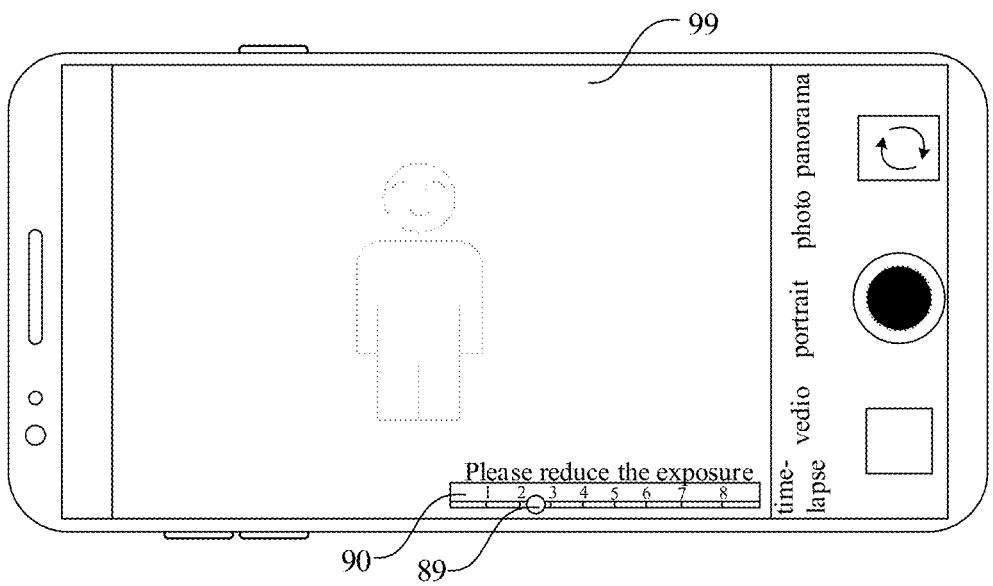
FIG. 8 is a schematic diagram showing a flow of displaying a message in another image processing method provided by the disclosure.
Figure 9:
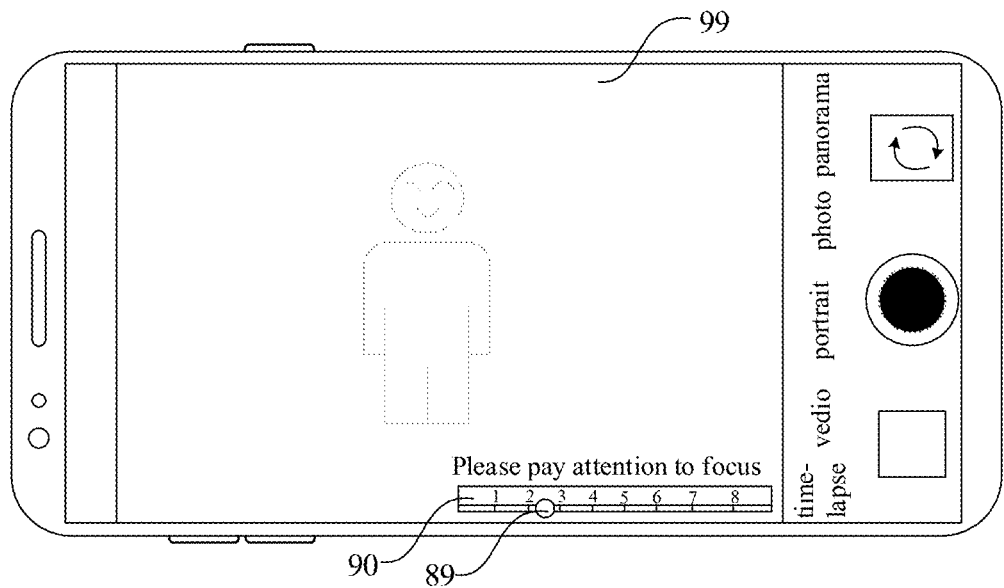
FIG. 9 is a schematic diagram showing another flow of displaying a message in another image processing method provided by the disclosure.

It can be understood that for an image, if the exposure time is too long or the sharpness is not high, the quality of the image is poor, causing much of the content in the image to be unrecognizable. When the evaluation score of the real-time preview image is lower than the first threshold, it can be judged that the exposure level and the focus parameters of the image are abnormal, thereby causing the image to be overexposed or the sharpness of the image is not enough. So, after obtaining the evaluation result, the mobile terminal can display a message on the preview interface. For example, as shown in FIG. 8, when the first threshold score is 3 points, and it is judged that the current evaluation score is lower than 3 points, then the user may be prompted to reduce the exposure in the preview interface. Furthermore, as shown in FIG. 9, if the evaluation score detected is lower than 3 points, the user may be prompted to re-focus manually to improve the sharpness. The message shown in FIGS. 8 and 9 is adjacent to and parallel with the evaluation result, and the message and the evaluation result are displayed at a lower right corner of the preview interface.

In addition to the aforementioned exposure and the sharpness (adjusted by adjusting the aforementioned focus parameters) affect the quality of the image, the composition of the image also affects the quality of the image. Usually the composition of the image is affected by a position of the mobile terminal and a shooting angle of the camera. Referring to FIG. 4 again, in FIG. 4, the composition target 94 is located at the lower right corner of the entire screen, but the area 93 is completely in a blank state, and thus causes the entire image to be uncoordinated, resulting in the image quality being affected.

Then in this case, as one manner, the image capturing parameters further include the position of the mobile terminal. Then, the operation of displaying a message for reminding the user to adjust image capturing parameters of the mobile terminal according to the evaluation result further includes: if the evaluation score detected is larger than a first threshold and is lower than a second threshold, displaying a message for reminding the user to adjust the gesture of handling the mobile terminal.

Figure 10:
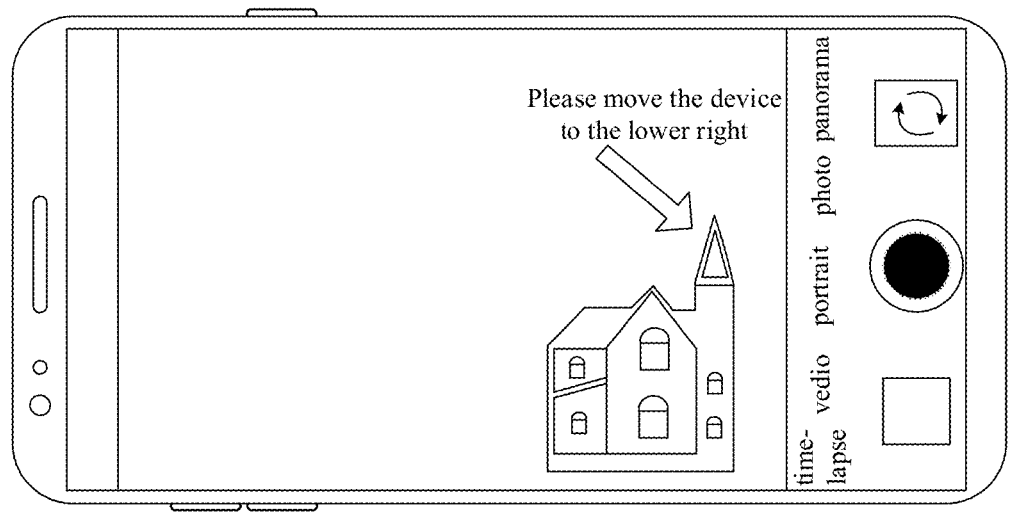
FIG. 10 is a schematic diagram showing still another flow of displaying a message in another image processing method provided by the disclosure.
Figure 11:
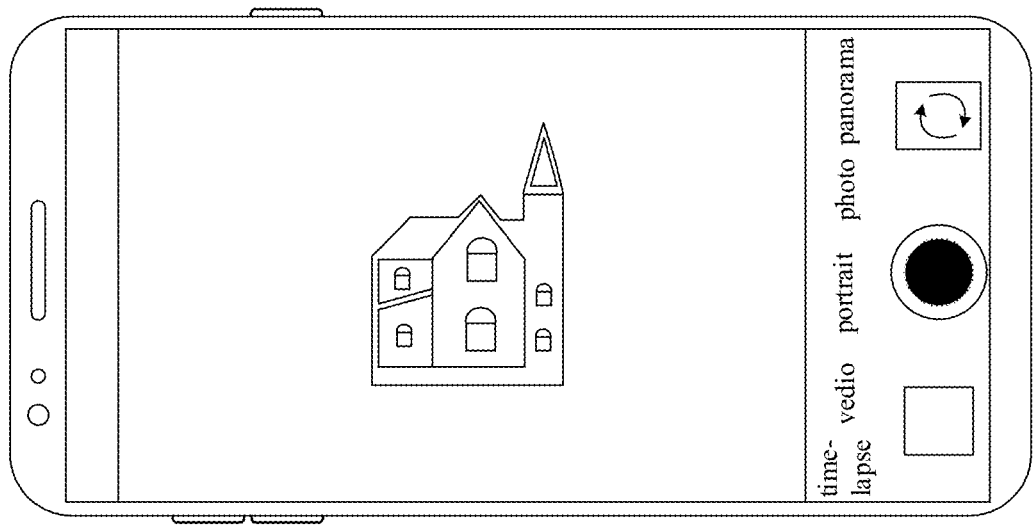
FIG. 11 is a schematic diagram showing a real-time preview image obtained by adjusting a position of a mobile terminal in another image processing method provided by the disclosure.

For example, as shown in FIG. 10, if the evaluation score is greater than the aforementioned first threshold but less than the second threshold, then it means there is a problem in the composition of the image. The position of the composition target of the image is further judged not at a central area of the real-time preview image, but at the lower right corner as shown in FIG. 10, in this case, a message is displayed for reminding the user to move the mobile terminal toward the lower right corner, so that the composition target can be moved to the central area of the real-time preview image as shown in FIG. 11. The message shown in FIG. 10 is above the composition target.

In the image processing method provided by the disclosure, after acquiring image parameters of a real-time preview image displayed in a preview interface, the real-time preview image is evaluated based on the image parameters and a pre-established image evaluation model thereby to obtain an evaluation result, the evaluation result is displayed and then a message for reminding the user to adjust image capturing parameters of the mobile terminal is displayed. Therefore, the user of the mobile terminal can obtain the evaluation result of the real-time preview image displayed in the preview interface in real time, so that the user can know the quality of the current real-time preview image in real time, and the user can adjust the real-time preview image as needed, in order to obtain images with better evaluation results. As such, the overall quality of the images captured by the mobile terminal can be improved.

Concurrently, because the mobile terminal displays the message reminding the user to adjust the image capturing parameters of the mobile terminal, the user can adjust the image capturing parameters of the mobile terminal more properly and more quickly to obtain images with higher scores, thereby improving the user experience.

Figure 12:
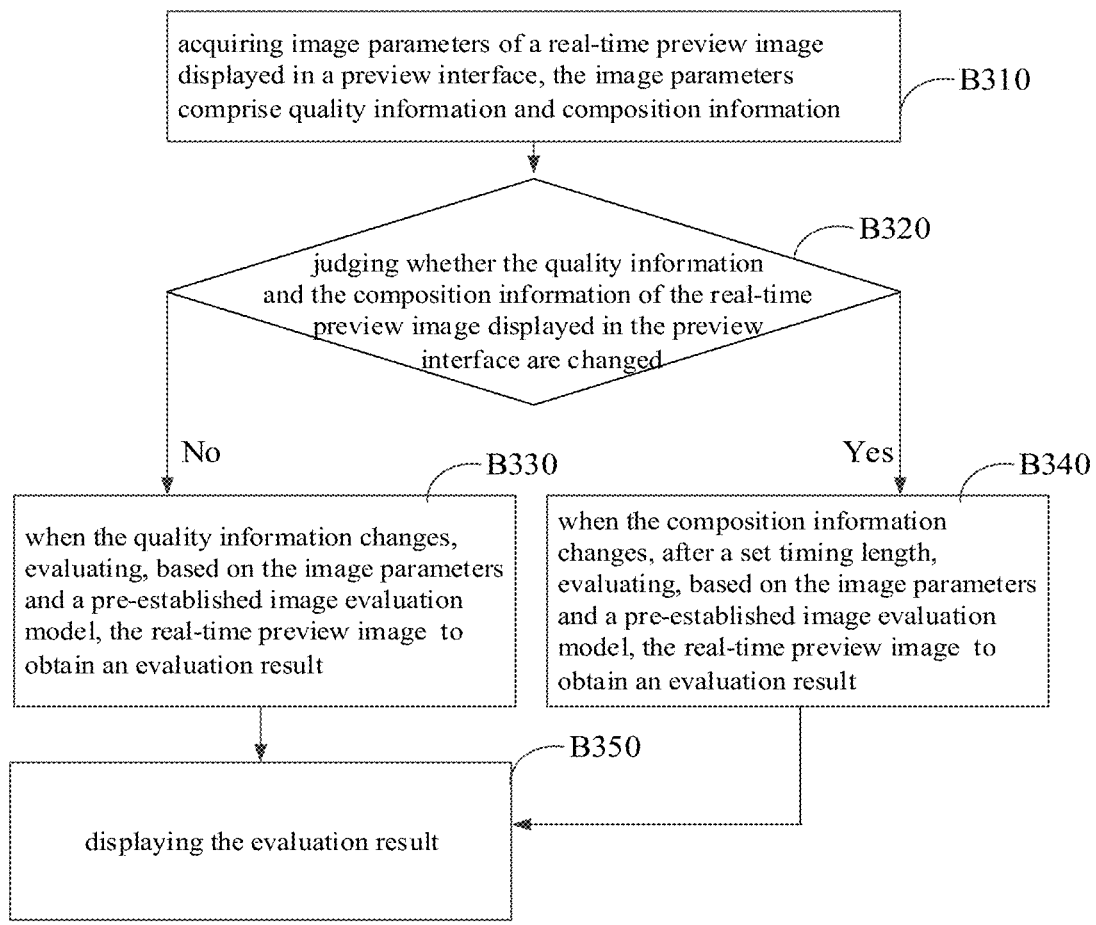
FIG. 12 is a flow chart of still another image processing method provided by the disclosure.

Referring to FIG. 12, the disclosure provides an image processing method applied to a mobile terminal, and the method includes:

Block B310: image parameters of a real-time preview image displayed in the preview interface are acquired, and the image parameters include quality information and composition information.

It can be understood that, as a manner, the image captured by the camera of the mobile terminal is usually stored in a storage space allocated by the mobile terminal, and the data stored in the storage space is updated in real time, that is, if the storage space is full, new data will overwrite the original data. Then, in the disclosure, if the data newly written to the storage space overwrites the original data, and the real-time preview image is evaluated at the same time, data errors may be caused. Because the mobile terminal needs to acquire the image parameters of the real-time preview image in the process of evaluating the real-time preview image, however the real-time preview image of the image parameters being acquired may have been covered by a new real-time preview image during the acquiring process, thereby causing data errors.

In order to improve the problem, a currently acquired real-time preview image may be transferred to another storage area allocated by the mobile terminal. It can be understood that the storage area is different from the foregoing storage space. After the real-time preview image is stored in the storage area, the image parameters of the real-time preview image stored in the storage area are acquired. So, even if the data of the original real-time preview image in the aforementioned storage space is overwritten, the acquiring of the image parameters of the original real-time preview image is not affected. Wherein, as a manner, the size of the storage area may be determined according to a memory allocated by the mobile terminal to an application controlling the camera. In at least one embodiment, an area may be allocated from the memory allocated by the mobile terminal to the application as the storage area, so as to avoid affecting the memory size allocated by the mobile terminal to other applications.

Block B320: quality information and composition information of the real-time preview image displayed in the preview interface are judged whether there is a change, compared with the quality information and the composition information of the real-time preview image displayed last time.

In the case that the mobile terminal transfers a completed real-time preview image in the foregoing storage space to the foregoing storage area, in some embodiments, the mobile terminal detects that there is a new real-time preview image in the storage space, and the new live preview image is transferred to be saved in the storage area. Then, as a manner, the mobile terminal can store the real-time preview images transferred from the storage space in a queue manner in the storage area, so that the mobile terminal can acquire the image parameters according to a storage order of the data in the queue.

Then in this case, the mobile terminal acquires data from the head of the queue for processing, and removes the data that has been processed from the queue. Then, after the current head data is acquired, the data of the previous head can be used as the parameter information of the real-time preview image displayed last time, and then a comparing process is performed.

Figure 13:
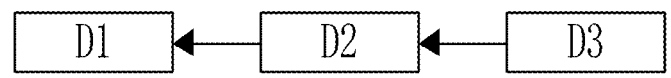
FIG. 13 is a schematic diagram showing a queue in still another image processing method provided by the disclosure.
Figure 14:
FIG. 14 is a schematic diagram showing another queue in still another image processing method provided by the disclosure.

The foregoing will be described below with reference to FIGS. 13 and 14. As shown in the queue of FIG. 13, the current queue stores data D1, data D2, and data D3, wherein the data D1 is the head data of the queue, and the data D3 is the tail data of the queue. When the mobile terminal takes the data D1 out of the queue for processing, the data D1 is the data processed for the first time, no data is processed before, so it can be judged that the quality information and the composition information included in the data D1 both are changed. After completing the processing of the data D1, the queue may be as shown in FIG. 14. At this time, the head of the queue is the data D2, when processing the data D2, the previous data D1 is used as the parameter information of the real-time preview image displayed last time.

It should be noted that the foregoing completing the processing of the data D1 refers to an evaluation result is obtained based on the quality information and the composition information included in the data D1.

Block B330: if the quality information changes, the real-time preview image is evaluated based on the quality information, the composition information, and the image evaluation model, to obtain an evaluation result.

Block B340: if the composition information changes, a time length of timing is set, when the composition information remains unchanged within the set timing length, the real-time preview image is evaluated to obtain an evaluation result, based on the quality information, the composition information, and the image evaluation model.

It should be noted that for the quality information, it is necessary to observe the influence on the evaluation result after the quality information changes very timely. For the composition information, the user needs to modify it slowly, then the influence of the composition information on the evaluation result can be reflected not so timely, so as to avoid the mobile terminal continuously calculating the real-time preview which causes a waste of resources, during a frequent movement of the mobile terminal.

It should be noted that, in the case that the currently acquired parameter information is the first acquisition, when the parameter information is acquired, the real-time preview may be evaluated to obtain the evaluation result, directly based on the quality information, the composition information, and the image evaluation model. It is no need to perform the aforementioned evaluation process after setting a time length of timing.

If the quality information and the composition information do not change, the process is ended.

Block B350, the evaluation result is displayed.

In the image processing method of the disclosure, after acquiring the image parameters of the real-time preview image displayed in the preview interface, the image parameters acquired at this time are compared with the image parameters acquired last time. After the quality information or the composition information in the image parameters is found to be changed, the real-time preview image is evaluated based on the quality information, the composition information, and the image evaluation model to obtain the evaluation result. Therefore, the user of the mobile terminal can obtain the evaluation result of the real-time preview image displayed in the preview interface in real time, so the user can get the quality of the current real-time preview image in real time, and the user can adjust the real-time preview image as needed, in order to obtain better images of the evaluation results, thereby improving the overall quality of the images captured by the mobile terminal.

At the same time, the image is evaluated after the quality information or the composition information is detected to be changed, such can reduce resource consumption and save power.

Figure 15:
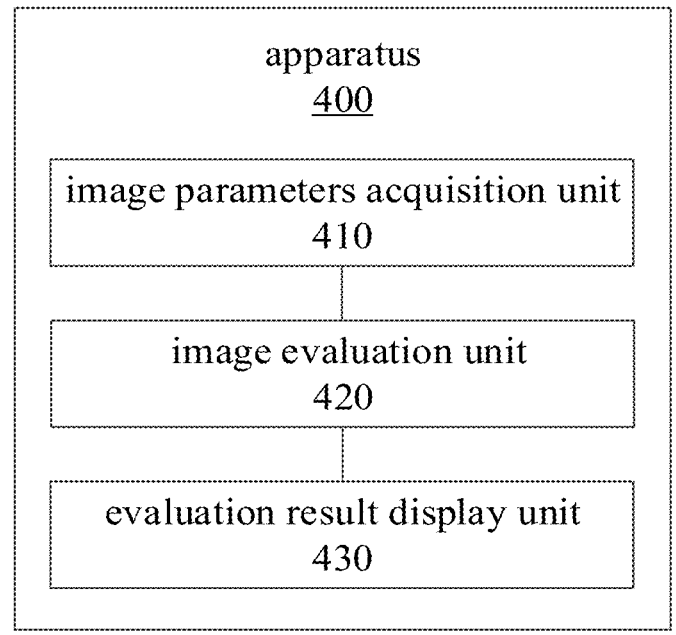
FIG. 15 is a structural block diagram of an image processing apparatus provided by the disclosure.

Referring to FIG. 15, the disclosure provides an image processing apparatus 400, operated on a mobile terminal. The apparatus 400 includes an image parameters acquisition unit 410, an image evaluation unit 420, and an evaluation result display unit 430.

The image parameters acquisition unit 410 is configured to acquire image parameters of the real-time preview image displayed in the preview interface.

The image evaluation unit 420 is configured to evaluate the real-time preview image based on the image parameters and a pre-established image evaluation model to obtain an evaluation result.

As a manner, the image parameters include quality information as well as composition information. The image evaluation unit 420 is specifically configured to evaluate the real-time preview image based on the quality information, the composition information, and the image evaluation model to obtain the evaluation result.

The evaluation result display unit 430 is configured to display the evaluation result.

As a manner, the evaluation result display unit 430 is specifically configured to suspended display a strip control and an identifier control that can slide on the strip control in the preview interface, and the strip control sequentially displays a number of segments from one end to the other end. The identifier control is controlled to be displayed in one of the segments which is corresponding to the evaluation result.

Figure 16:
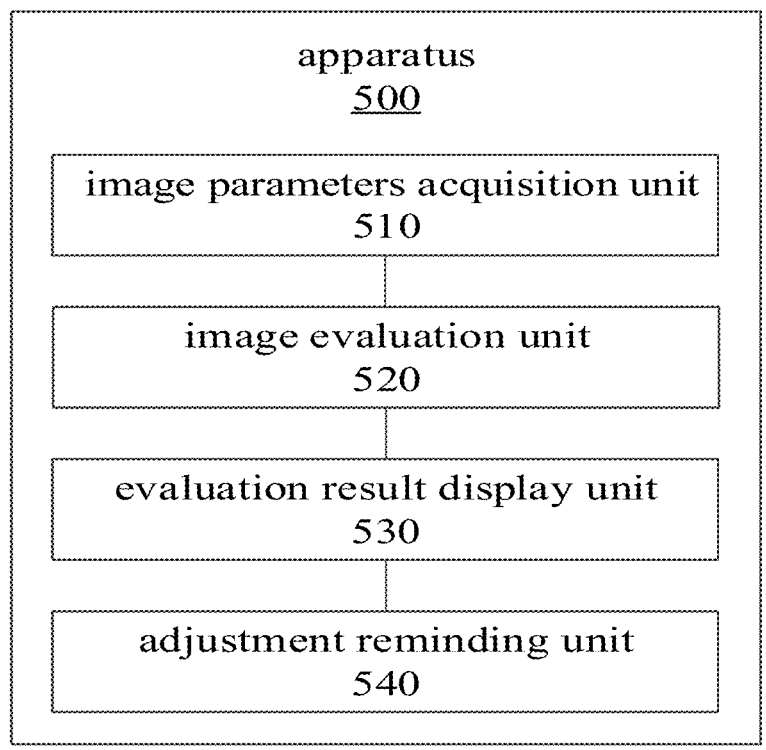
FIG. 16 is a structural block diagram of another image processing apparatus provided by the disclosure.

Referring to FIG. 16, the disclosure provides an image processing apparatus 500 operated on a mobile terminal. The apparatus 500 includes an image parameters acquisition unit 510, an image evaluation unit 520, an evaluation result display unit 530, and an adjustment reminding unit 540.

The image parameters acquisition unit 510 is configured to acquire image parameters of the real-time preview image displayed in the preview interface.

The image evaluation unit 520 is configured to evaluate the real-time preview image based on the image parameters and a pre-established image evaluation model to obtain an evaluation result.

The evaluation result display unit 530 is configured to display the evaluation result.

The adjustment reminding unit 540 is configured to display a message for reminding the user to adjust image capturing parameters of the mobile terminal, according to the evaluation result.

As a manner, the image capturing parameters include the exposure or focus parameters, and the evaluation result includes an evaluation score. The adjustment reminding unit 540 is specifically configured to display a message reminding the user to adjust the exposure or adjust the focus parameters, when the evaluation score detected is lower than the first threshold.

As another manner, the image capturing parameters further include a position of the mobile terminal. The adjustment reminding unit 540 is configured to display a message reminding the user to adjust the position of the mobile terminal, when the evaluation score detected is greater than the first threshold and less than the second threshold.

Figure 17:
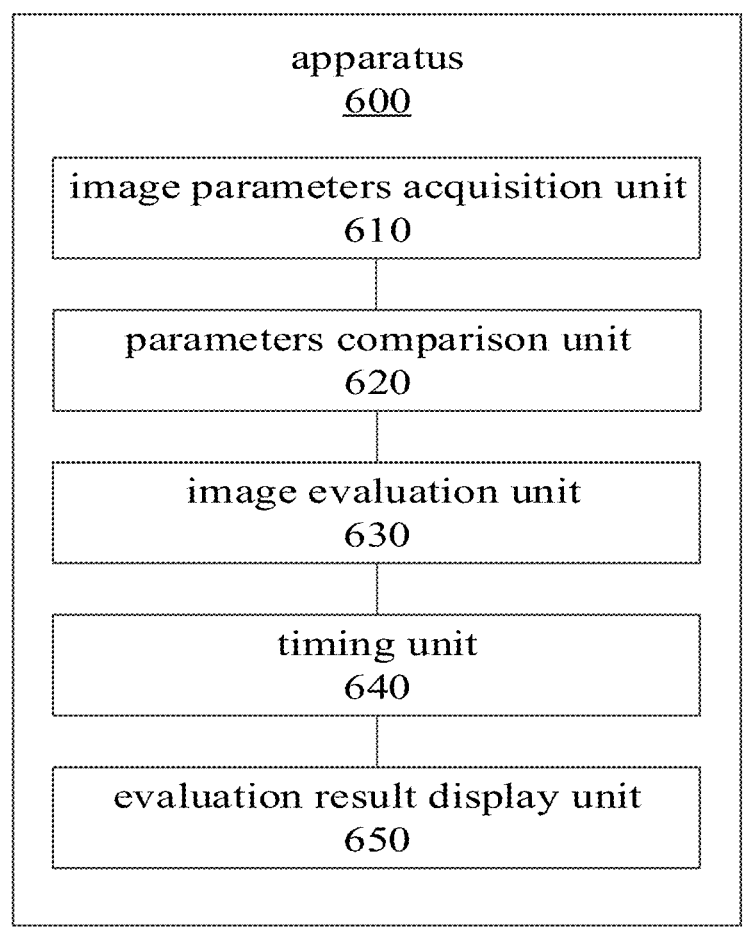
FIG. 17 is a structural block diagram of still another image processing apparatus provided by the disclosure.

Referring to FIG. 17, the disclosure provides an image processing apparatus 600 operated on a mobile terminal. The apparatus 600 includes an image parameters acquisition unit 610, a parameters comparison unit 620, an image evaluation unit 630, a timing unit 640, and an evaluation result display unit 650.

The image parameters acquisition unit 610 is configured to acquire image parameters of the real-time preview image displayed in the preview interface, where the image parameters include quality information and composition information.

The parameters comparison unit 620 is configured to judge whether the quality information and the composition information of the real-time preview image displayed in the preview interface changes or not, compared to the quality information and the composition information of the previous real-time preview image displayed in the preview interface.

The image evaluation unit 630 is configured to evaluate the real-time preview image based on the image parameters and a pre-established image evaluation model to obtain an evaluation result, when the parameters comparison unit 620 judges that the quality information changes.

The timing unit 640 is configured to start timing when the parameters comparison unit 620 determines that the composition information changes.

The image evaluation unit 630 is specifically configured to evaluate the real-time preview image based on the image parameters and the pre-established image evaluation model to obtain an evaluation result, after the time length set by the timing unit 640.

The evaluation result display unit 650 is configured to display the evaluation result.

It should be noted that, those skilled in the art can clearly understand that for the convenience and brevity of the description, the specific working process of the foregoing apparatus and units may refer to the corresponding process in the foregoing method, and details are not described herein again. In the embodiments provided of the disclosure, the coupling relationship of modules to one another may be electrical, mechanical or other forms. In addition, functional modules in each embodiment of the disclosure may be integrated into one processing module, or the functional modules each may exist physically separately, or two or more functional modules may be integrated into one module. The above integrated module can be implemented in the form of hardware or in the form of software functional modules.

It should be noted that, in the disclosure, how to encode audio data according to an audio coding type may be prior art, which is not described in detail in this application.

In the image processing method, the image processing apparatus, and the mobile terminal provided by the disclosure, after acquiring image parameters of a real-time preview image displayed in a preview interface, the real-time preview image is evaluated based on the image parameters and a pre-established image evaluation model, thereby to obtain an evaluation result, and the evaluation result is displayed. Therefore, the user of the mobile terminal can obtain the evaluation result of the real-time preview image displayed in the preview interface in real time, so the user can get the quality of the current real-time preview image in real time, and the user can adjust the real-time preview image as needed, in order to obtain images with better evaluation results, thereby improving the overall quality of the images captured by the mobile terminal.

A mobile terminal provided by the disclosure will be described below with reference to FIG. 18.

Figure 18:
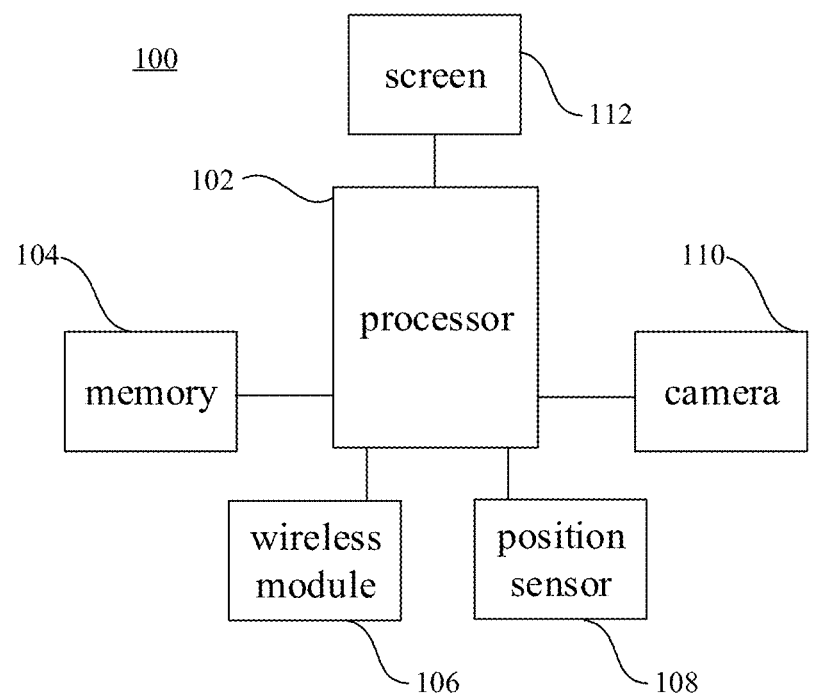
FIG. 18 is a structural block diagram of a mobile terminal provided by the disclosure.

Referring to FIG. 18, another embodiment of the present application further provides a mobile terminal 100 that can perform the foregoing method, based on the image processing method and apparatus described above. The mobile terminal 100 includes one or more (just one in the figure) processor(s) 102, a memory 104, a wireless module 106, a position sensor 108, a camera 110, and a screen 112 that are coupled to each other. The memory 104 stores therein a program that can execute the contents of the foregoing embodiments, and the processor 102 can execute the program stored in the memory 104.

The processor 102 can include one or more processing core(s). The processor 102 connects every parts of the entire mobile terminal 100 using various interfaces and lines, by running or executing instructions, programs, sets of codes or sets of instructions stored in the memory 104, and invoking data stored in the memory 104, various functions of the mobile terminal 100 are executed and data is processed. In at least one embodiment, the processor 102 can be implemented in a hardware form, such as at least one of Digital Signal Processing (DSP), Field-Programmable Gate Array (FPGA), and Programmable Logic Array (PLA). The processor 102 can integrate one or more of a central processing unit (CPU), a graphics processing unit (GPU), a modem, and the like. Wherein the CPU mainly deals with an operating system, user interfaces and applications, etc.; the GPU is responsible for rendering the display content; the modem is used to process wireless communication. It can be understood that the above modem may also not be integrated into the processor 102 and is implemented by a single communication chip.

The memory 104 may include a Random Access Memory (RAM), and may also include a Read-only Memory. Memory 104 can be used to store instructions, programs, codes, sets of codes, or sets of instructions. The memory 104 may include a storage program area and a storage data area, wherein the storage program area may store instructions for implementing the operating system, instructions for implementing at least one function (such as a touch function, a sound playing function, an image playing function, etc.), instructions for implementing the method of the above described embodiments, and the like. The storage data area can store data (such as a phone book, audio and video data, chat recording data) created by the terminal 100 during use.

The wireless module 106 is configured to receive and transmit electromagnetic waves, and realize mutual conversion between electromagnetic waves and electrical signals, thereby communicating with a communication network or other devices, for example, with an audio playback device. The wireless module 106 can include various conventional circuit components for performing these functions, such as an antenna, a radio frequency transceiver, a digital signal processor, an encryption/decryption chip, a Subscriber Identity Module (SIM) card, a memory, etc. The wireless module 106 can communicate with various networks such as the internet, an intranet, a wireless network, or can communicate with other devices via wireless network. The wireless network described above may include a cellular telephone network, a wireless local area network, or a metropolitan area network.

Moreover, the position sensor 108 can be used to capture the current position of the mobile terminal. In some embodiments, the position sensor 108 includes one or more of a gyroscope, an acceleration sensor, and a gravity sensor.

The camera 110 can capture images for display on the screen 112.

Figure 19:
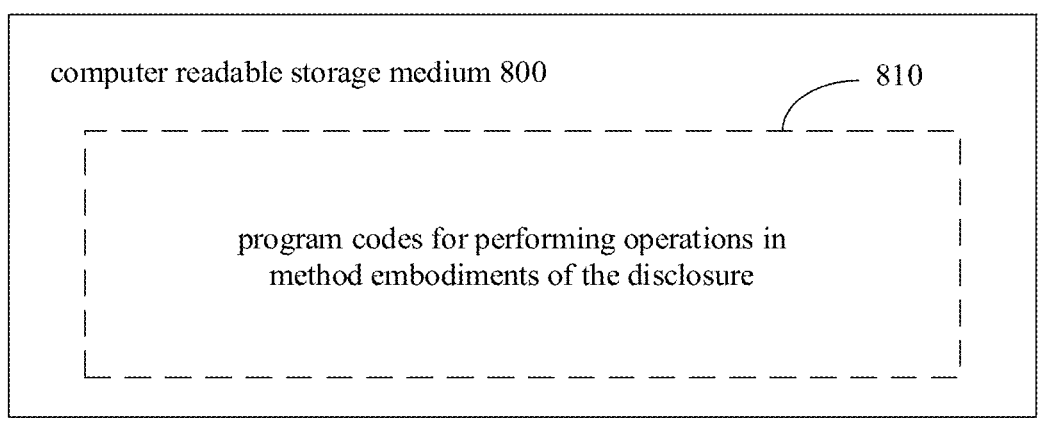
FIG. 19 is a storage unit configured for storing or carrying program codes for implementing an image processing method according to an embodiment of the disclosure.

Please refer to FIG. 19, which illustrates a structural block diagram of a computer readable storage medium provided by an embodiment of the disclosure. Program codes are stored in the computer readable medium 800, and can be invoked by a processor to perform the method described in the above method embodiments.

The computer readable storage medium 800 can be an electronic memory such as a flash memory, an EEPROM (Electrically Erasable Programmable Read Only Memory), an EPROM, a hard disk, or a ROM. In at least one embodiment, the computer readable storage medium 800 includes a non-transitory computer-readable storage medium. The computer readable storage medium 800 has a storage space for program codes 810 that can perform any of the method blocks described above. The program codes can be read from or written to one or more computer program products. Program codes 810 can be compressed in a suitable form, for example.

It should be noted that the above embodiments are only used to explain the technical solutions of the present disclosure, and are not limited thereto; although the present disclosure is described in detail with reference to the foregoing embodiments, those skilled in the art understand that the technical solutions described in the foregoing embodiments may be modified, or some of the technical features may be equivalently replaced; and the modifications and substitutions do not drive the essence of the corresponding technical solutions from the spirit and scope of the technical solutions of the embodiments of the present disclosure.

What is claimed is:

1. An image processing method comprising:
    acquiring image parameters of a real-time preview image displayed in a preview interface, wherein the image parameters comprise quality information and composition information, the quality information comprises at least one of exposure, sharpness, color information, and noise information; and the composition information includes a composition mode and position information of a composition target corresponding to the composition mode in the image;
    evaluating, based on the image parameters and a pre-established image evaluation model, the real-time preview image to obtain an evaluation result; and
    displaying the evaluation result;
    wherein before the operation of evaluating the real-time preview image to obtain an evaluation result, the method further comprises:
        judging whether one of the quality information and the composition information of the real-time preview image displayed in the preview interface is changed, compared respectively with the quality information and the composition information of a previous real-time preview image;
        when the quality information changes, performing the operation of evaluating the real-time preview image to obtain an evaluation result;
        when the composition information changes, setting a timing length, and if the composition information remains unchanged during the timing length, performing the operation of evaluating the real-time preview image to obtain an evaluation result.

2. The method as claimed in claim 1, wherein the method further comprises:
    displaying a message for reminding a user to adjust image capturing parameters of a mobile terminal according to the evaluation result.

3. The method as claimed in claim 2, wherein the image capturing parameters comprise an exposure or focus parameters, the evaluation result comprises an evaluation score;
    wherein the operation of displaying a message for reminding a user to adjust image capturing parameters of the mobile terminal according to the evaluation result comprises:
        displaying a message for reminding the user to adjust the exposure or the focus parameters when the evaluation score is lower than a first threshold.

4. The method as claimed in claim 3, wherein the image capturing parameters further comprise a position of the mobile terminal;
    wherein the operation of displaying a message for reminding a user to adjust image capturing parameters of the mobile terminal according to the evaluation result comprises:
        displaying a message for reminding the user to adjust the position of the mobile terminal when the evaluation score is greater than the first threshold and less than a second threshold.

5. The method as claimed in claim 1, wherein the composition mode is selected from one of portrait mode, object mode, and landscape mode, the composition target corresponding to the portrait mode is a human being, the composition target corresponding to the object mode is an object, and the composition target corresponding to the landscape mode is a horizontal line or a dividing line.

6. The method as claimed in claim 5, wherein the composition mode is determined as the portrait mode, when the real-time preview image is recognized to include a human face, and position information of a human body in the image is determined according to the position of the recognized human face relative to a boundary of the image.

7. The method as claimed in claim 5, wherein the composition mode is determined as the object mode, when the real-time preview image has a foreground image without a human face, and position information of the object is determined according to a distance from a center of the object to a center of the real-time preview image.

8. A method for image processing, comprising:
    acquiring image parameters of a real-time preview image displayed in a preview interface;
    evaluating, based on the image parameters and a pre-established image evaluation model, the real-time preview image to obtain an evaluation result; and
    displaying the evaluation result, comprising:
        floating display a strip control and an identifier control slidable on the strip control, wherein the strip control displays a plurality of interval segments sequentially from one end to another end; and
        controlling the identifier control to be displayed on one of the plurality of interval segments which is corresponding to the evaluation result.

9. The method as claimed in claim 8, wherein the method further comprises:
    displaying a message for reminding a user to adjust image capturing parameters of a mobile terminal according to the evaluation result;
    wherein the message is displayed adjacent to and parallel with the strip control.

10. The method as claimed in claim 8, wherein the method further comprises:
    displaying a message for reminding a user to adjust image capturing parameters of a mobile terminal according to the evaluation result.

11. The method as claimed in claim 10, wherein the image capturing parameters comprise an exposure or focus parameters, the evaluation result comprises an evaluation score;

wherein the operation of displaying a message for reminding a user to adjust image capturing parameters of the mobile terminal according to the evaluation result comprises:
displaying a message for reminding the user to adjust the exposure or the focus parameters when the evaluation score is lower than a first threshold.

12. The method as claimed in claim 11, wherein the image capturing parameters further comprise a position of the mobile terminal;
wherein the operation of displaying a message for reminding a user to adjust image capturing parameters of the mobile terminal according to the evaluation result comprises:
displaying a message for reminding the user to adjust the position of the mobile terminal when the evaluation score is greater than the first threshold and less than a second threshold.

13. The method as claimed in claim 8, wherein before the operation of evaluating the real-time preview image to obtain an evaluation result, the method further comprises:
judging whether one of a quality information and composition information of the real-time preview image displayed in the preview interface is changed, compared with quality information and composition information of a previous real-time preview image;
when the quality information changes, performing the operation of evaluating the real-time preview image to obtain an evaluation result;
when the composition information changes, setting a timing length, if the composition information remains unchanged during the timing length, performing the operation of evaluating the real-time preview image to obtain an evaluation result.

14. A mobile terminal, comprising:
one or more processor(s) and a memory;
wherein one or more program(s) is(are) stored in the memory and configured to be executed by the one or more processor(s), the one or more program(s) is(are) configured to perform an image processing method when being executed, and the method comprises:
acquiring image parameters of a real-time preview image displayed in a preview interface;
evaluating, based on the image parameters and a pre-established image evaluation model, the real-time preview image to obtain an evaluation result; and
displaying the evaluation result, comprising:
floating display a strip control and an identifier control slidable on the strip control, wherein the strip control displays a plurality of interval segments sequentially from one end to another end; and
controlling the identifier control to be displayed on one of the plurality of interval segments which is corresponding to the evaluation result.

15. The mobile terminal as claimed in claim 14, further comprising a screen, wherein the preview interface is displayed on the screen, and the evaluation result is displayed in the preview interface.

16. The mobile terminal as claimed in claim 15, wherein a control interface is displayed on the screen adjacent to the preview interface, and a control button, an image browsing button, and a front and rear camera switching button are displayed in the control interface.

17. The mobile terminal as claimed in claim 14, further comprising a position sensor coupled to the one or more processor(s), wherein the position sensor is configured to capture a position of the mobile terminal.

18. The mobile terminal as claimed in claim 14, wherein the method further comprises:
displaying a message for reminding a user to adjust image capturing parameters of a mobile terminal according to the evaluation result.

19. The mobile terminal as claimed in claim 18, wherein the image capturing parameters comprise an exposure or focus parameters, the evaluation result comprises an evaluation score;
wherein the operation of displaying a message for reminding a user to adjust image capturing parameters of the mobile terminal according to the evaluation result comprises:
displaying a message for reminding the user to adjust the exposure or the focus parameters when the evaluation score is lower than a first threshold.

20. The mobile terminal as claimed in claim 14, wherein before the operation of evaluating the real-time preview image to obtain an evaluation result, the method further comprises:
judging whether one of quality information and composition information of the real-time preview image displayed in the preview interface is changed, compared with quality information and composition information of a previous real-time preview image;
when the quality information changes, performing the operation of evaluating the real-time preview image to obtain an evaluation result;
when the composition information changes, setting a timing length, if the composition information remains unchanged during the timing length, performing the operation of evaluating the real-time preview image to obtain an evaluation result.

* * * * *